United States Patent [19]

Reischl et al.

[11] Patent Number: 4,735,725
[45] Date of Patent: Apr. 5, 1988

[54] PROCESS FOR THE IMPROVED SEPARATION OF CLARIFIED LIQUID FROM BIOMASS IN THE BIOLOGICAL TREATMENT OF SEWAGE

[75] Inventors: Artur Reischl, Leverkusen; Hanno Henkel, Krefeld; Friedhelm Sahlmen, Moers, all of Fed. Rep. of Germany

[73] Assignee: Bayer Aktiengesellschaft, Leverkusen Bayerwerk, Fed. Rep. of Germany

[21] Appl. No.: 886,853

[22] Filed: Jul. 18, 1986

[30] Foreign Application Priority Data

Jul. 23, 1985 [DE] Fed. Rep. of Germany ....... 3526183

[51] Int. Cl.$^4$ .............................................. C02F 3/08
[52] U.S. Cl. .................... 210/616; 210/626; 210/695; 210/151
[58] Field of Search ............... 210/616, 695, 617, 618, 210/150, 151, 510.1, 626

[56] References Cited

U.S. PATENT DOCUMENTS

| | | | |
|---|---|---|---|
| 3,351,203 | 11/1967 | Robb et al. | 210/65 |
| 3,697,420 | 10/1972 | Blaisdell et al. | 210/42 |
| 3,951,799 | 4/1976 | Weiss et al. | 210/75 |
| 4,115,534 | 9/1978 | Ithakissios | 424/1 |
| 4,167,479 | 9/1979 | Besik | 210/617 |
| 4,200,524 | 4/1980 | Levin | 210/616 |
| 4,576,718 | 3/1986 | Reischl et al. | 210/616 |
| 4,608,397 | 8/1986 | Reischl | 521/101 |

OTHER PUBLICATIONS

Lehrund Handbuch der Abwassertechnik, vol. II, 2nd ed. & Korrespondenz Abwasser, No. 4, 1985.
L. O. Kolarik, Water Research, vol. 17, pp. 141–147, 1984.
C. deLatour & H. K. Holm, "Journal of the American Waterworks Assoc.", Jun. 1977, pp. 325–327.
R. Yadidia et al, "Environmental Science and Technology", vol. 11, No. 9, pp. 913–916, 1977.

Primary Examiner—Benoit Castel
Attorney, Agent, or Firm—Gene Harsh; Joseph C. Gil

[57] ABSTRACT

The present invention relates to a process for the improved separation of clarified liquids from biomass in the aerobic and/or anaerobic biological treatment of sewage carried out using magnetically separable materials as carriers. The magnetically separable inorganic materials are used in quantities of from 1 to 150% by weight, based on activated sludge dry matter. The carriers consist of magnetically separable inorganic materials. The magnetically separable materials used are oxides or mixed oxides of heavy metals, preferably iron oxides, such as $Fe_3O_4$ (magnetite) and $\gamma\text{-}Fe_2O_3$, which are used in average particle sizes of less than 50 μm, preferably less than 10 μm and more preferably less than 3 μm (for example from 0.1 to 1 μm). These magnetic carriers provide for improved sedimentation or for magnetic separation of the biomasses containing the magnetic materials in the biological treatment of sewage.

5 Claims, 2 Drawing Sheets

PROCESS FOR THE IMPROVED SEPARATION OF CLARIFIED LIQUID FROM BIOMASS IN THE BIOLOGICAL TREATMENT OF SEWAGE

BACKGROUND OF THE INVENTION

In biological sewage treatment plants, the biological sewage treatment process is carried out aerobically and anaerobically using microorganisms to eliminate the organic impurities in the sewage. In the metabolic processes which take place, the microorganisms proliferate in large numbers.

In practice, the so-called activated sludge process is predominantly used for the aerobic and/or anaerobic treatment process using the continuous-flow principle. In continuous-flow operation, sewage and activated sludge are fed to the activated-sludge tank where, in the aerobic or anaerobic process, the biochemical processes take place. The oxygen may be supplied in such a way that, at the same time, high turbulence is generated in the activated-sludge tank, ensuring optimal mixing of sewage and activated sludge. The mixture of sewage and activated sludge flows from the activated-sludge tank into intermediate or final settling tanks in which the activated sludge separates from the purified sewage. To maintain as high a concentration of activated sludge as possible in the activated-sludge tank, most of the activated sludge deposited in the intermediate or final settling tanks is recycled to do more biological treatment work. Only the surplus activated sludge formed by proliferation of the microorganisms is removed from the system and fed to the clarified sludge disposal stage.

Accordingly, most of the activated sludge is in a state of permanent circulation. However, the separation of sewage and activated sludge in the final settling tanks is difficult because, in many cases, the activated sludge is particularly light and, because of this, only settles very slowly or incompletely. However, a high degree of settling and the substantially complete recycling of the activated sludge are essential for ensuring the necessary degree of purification and for remaining within legally stipulated limits.

It is standard practice to base the dimensions of the intermediate and final settling tanks on retention times of from 2 to 4 hours. However, where the tank volume is predetermined by the retention time, it is only possible to achieve a high degree of efficiency when the dimensions of the final settling tanks are also optimally selected for the settling process of the activated sludge.

Determining factors so far as the dimensions are concerned are the length, width or depth, diameter and volume of the final settling tank. The dimensions are characterized by the load per unit area per hour ($m^3$ sewage/$m^2$ surface.h). The load per unit area of the final settling tanks must always be lower than the settling rate of the activated sludge. However, the permitted limit for the load per unit area of the final settling tanks is ultimately determined by the condition and quantity of the sludge introduced with the sewage.

Settling behavior is characterized by the sludge index ($I_{sv}$) which indicates how large the volume ($V_s$) of 1 g of dry sludge matter ($TS_R$) is after a settling time of 30 minutes.

$$I_{sv} = \frac{V_s}{TS_R} - \frac{ml}{g}$$

With properly dimensioned tanks, it is generally possible to obtain a good settling effect for a sludge index of $<100$ ml/g. If, however, the settling process is impeded by high solids loads and, in particular, by the formation of bulking sludge, the activated sludge floats and drifts.

Settling processes are seriously impeded, beginning at a sludge index of $>150$ ml/g. There are various known causes for this increase, including, for example, the inclusion of materials of light specific gravity (such as fats) in the activated sludge, buoyancy through adhering gas bubbles (particularly in denitrification processes) and especially the formation of bulking sludge through filament-like organisms which proliferate in relatively large numbers.

This phenomenon is particularly serious in that it increases the settable materials in the effluent of the treatment plant, which can exceed by many times the legally stipulated maximum limit of 0.5 ml/l, and thus, deprives the system of biologically active sludge which seriously reduces the efficiency of treatment.

To improve the settling behavior of activated sludges and to eliminate bulking sludge, the literature (cf. Lehrand Handbuch der Abwassertechnik, Vol. II, 2nd Edition, and Korrespondenz Abwasser No. 4, 1985) describes such measures as, for example, damaging the filament-like microorganisms by chlorine or hydrogen superoxide, process modifications, increasing the weight of the activated sludge by preclarified sludge, adding lime and/or iron or aluminium salts.

All these measures are attended by the disadvantage that they are only partly successful, if at all, or are only effective after prolonged treatment times or involve very considerable expense or give rise to disadvantages in the subsequent disposal of the clarified sludge.

The use of alkaline pretreated magnetite particles for the removal of discoloration and turbidity from river water is described in L. O. Kolarik, Water Research, Vol. 17, p. 141-147 (1984). The magnetite is regenerated by acidifying (emission of absorbed particles) and subsequent alkali treatment (magnetite particles become again positively charged and active). Untreated magnetite proved to be practically without effect for the river water treatment.

Similar water purification processes are described by C. deLatour and H. K. Holm in the Journal of American Waterworks Association, June 1977, p. 325-327. Other water purification processes with magnetite relate to the removal of algae through absorption with magnetite in the presence of ferric chloride (R. Yadidia et al., Enviromental Science and Technology, Vol. 11, No. 9, p. 913-916, 1977).

It has now surprisingly been found that the disadvantages attending the biological treatment of sewage can be avoided by using magnetically separable materials which, as carrier materials, provide for rapid settling of the activated sludge as a whole. In addition, it is possible by addition of these magnetically separable materials to obtain a distinctly higher concentration of activated sludge and, hence, higher throughputs in the activated sludge tanks and the final settling tanks or, by applying a magnetic field, to obtain excellent separation or, by magnetic separation, to separate off the activated sludge without final settling tanks.

DESCRIPTION OF THE INVENTION

Figure 1:
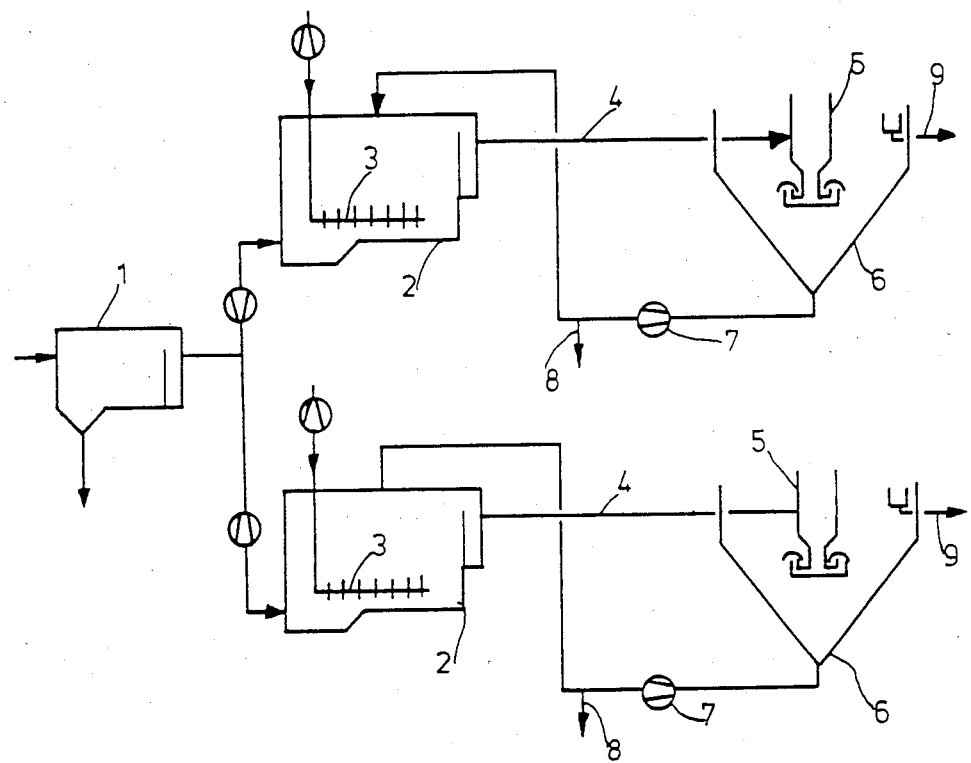
FIGS. 1 through 4 represent embodiments of the present invention.

The present invention relates to a process for the improved separation of clarified liquid from biomass in the aerobic and/or anaerobic biological treatment of sewage, (including nitrifying and denitrifying) characterized in that the biomasses (or activated sludges) are combined in the clarified liquid with magnetically separable inorganic materials. The magnetically separable inorganic materials are used in quantities of from 1 to 150% by weight, based on activated sludge dry matter. The biomasses containing these additives can then be sedimented and/or they can be separated in magnetic fields.

More particularly, magnetically separable inorganic materials (preferably magnetite) are combined with the biomass in the clarified liquid of the activated sludge stage, thoroughly mixed and sedimented in separate settling tanks and/or separated in a magnetic field.

In one particular embodiment, the process according to the invention is carried out by irreversibly removing only a proportion (preferably corresponding to the excess of activated sludge) of the mixture of biomass and magnetically separable inorganic materials (preferably magnetite) by sedimentation and/or separation in a magnetic field, optionally freeing the fraction thus removed from water and then disposing of it, for example by incineration or dumping, and then returning the other, generally larger portion to an activated-sludge stage.

According to the invention, the sewage may even be freed in following stages of the treatment process from the suspended biomasses and the magnetic materials by magnetic fields, preferably at spillways.

The process according to the invention may be used with particular advantage in two different processes:

1. As a clearing measure in the presence of bulking sludge. In the most simple case, magnetite ($Fe_3O_4$) having a particle size of $<50$ μm and preferably $<10$ μm is introduced into the activated-sludge tank or final settling tank in a quantity of from about 1 to 150% by weight and preferably in a quantity of from 10 to 50% by weight, based on activated sludge dry matter. After thorough mixing, the bulking sludge no longer floats, but instead settles rapidly.

2. In order to avoid problems, for example, attributable to bulking sludge, from the outset, from 1 to 150% by weight, preferably from 10 to 75% by weight and more preferably from 10 to 50% by weight of magnetite ($Fe_3O_4$) having a particle size of $<50$ μm and preferably $<3$ μm are added. The magnetic biomass is separated substantially quantitatively by applying a magnetic field to the effluent of the final settling tank. Alternatively, the final settling tanks may be omitted and the biomass can be separated by means of a magnetic field and then either recirculated in any ratio or removed from the circuit as surplus sludge.

The advantages of the process according to the invention as a clearing measure are obvious. By the addition of magnetite, the sludge can be influenced so favorably in a short time that it is safely prevented from floating, thus ensuring that the limits for the settable materials at the outlet of the treatment plant are observed.

In this particular application, it is possible to guarantee the efficiency of treatment by retention of the biomass. It is also possible to obtain a distinct increase in throughput by repeatedly increasing the active biomasses in the activated-sludge tank and optimally to utilize overloaded final settling tanks through the acceleration in sedimentation.

The advantages of the invention lie principally in the increases in operational reliability and in throughput and in the improved possibility of separating magnetic biomasses using magnetic fields. By virtue of the magnetic separation, final settling tanks of large volume are no longer necessary, overloaded treatment plants may be restored to normal loads and new treatment plants may be built with much smaller tank volumes. In cases where the inorganic, magnetically separable compounds have irreversibly combined with the activated sludge, the subsequent removal of water from the excess activated sludge is distinctly improved with savings of flocculation aids.

According to the invention, the carriers can be separated with the grown biomass in a magnetic field, for example with a rotating magnetic roller or a magnetic net and may be separated off from the biomass, for example by squeezing out between two contrarotating rollers and recycled quantitatively, i.e. with virtually no loss of carrier, to the activated-sludge stage. On the other hand, the biomass accumulates in a concentration from 3 to 6 times higher than in any standard sedimentation process, which is another advantage. The sludge concentrate may be recycled as required in any ratio to an activated-sludge tank or removed from the circuit as excess sludge and disposed of without any need for the otherwise usual sedimentation in final settling tanks. In one special embodiment of the process, it is even possible completely to suppress the formation of bulking sludge and, by installing a weir which permits magnetic separation, to accumulate magnetically separable carrier in such a large quantity - variable as required - that it acts like a filter and completely eliminates suspended constituents from the sewage so that the overflowing liquid is particularly clear.

Substantially any magnetic inorganic material may be used. The production of iron oxide pigments is accompanied by the formation of large quantities of magnetic iron oxide $Fe_3O_4$ (magnetite) in a particle size of generally below 3 μm which is particularly suitable for use in the present invention. Also useful are oxides or mixed oxides of heavy metals, preferably iron oxides such as $\gamma$-$Fe_2O_3$. Also useful are chromium (IV) oxide, and barium ferrite. The magnetic inorganic materials generally will have average particle sizes of less than 50 μm, preferably less than 10 μm, and most preferably less than 3 μm, for example, from 0.1 to 1 μm.

The invention is further illustrated but is not intended to be limited by the following examples in which all parts and percentages are by weight unless otherwise specified.

EXAMPLE 1

(FIG. 1)

Two parallel pilot-scale experimental sewage treatment plants, one of which was operated without a carrier for comparison (blank test) and the other with a magnetically separable carrier in accordance with the present invention, consisting of a 1.5 $m^3$ preliminary clarification stage, a 2.6 $m^3$ activated sludge stage and a 1.3 $m^3$ final settling stage. Both plants are filled with activated sludge from an industrial sewage treatment plant, which was characterized by the formation of bulking sludge, and operated with a typical flow of sewage.

From the preliminary clarification tank (1), the activated-sludge tank (2) is continuously charged with 430 l/h of sewage corresponding to a retention time of 6 hours. Oxygen is supplied through perforated pipes (3) at the bottom of the tank.

The mixture of activated sludge and sewage is delivered through pipe (4) to the degassing cyclone (5) and introduced into the final settling tank (6). The sludge is returned to the activated-sludge tank (2) by the pump (7). The surplus sludge is run off via the bypass (8). The purified sewage leaves the final settling tank via the channel (9).

The test plant I is operated without magnetite while the test plant II is operated in accordance with the invention with 10 liters of 29% by weight aqueous magnetite suspension. This gives a concentration of magnetite ($Fe_3O_4$) of 20% by weight, based on activated sludge dry matter.

The test results are set out in Table 1 below.

plant I does not contain any magnetite. The small amounts of magnetic iron oxide are sufficient for quantitatively fixing the biomasses by the magnetic field.

Above the magnetic grid, there is no activated sludge, whereas in the blank test in plant I large quantities of activated sludge are present in the comparable zone. The measurement results are comparable with those of Example 1, except that the percentage of suspended matter is even lower and, in a total of nine measurements, is always less than 20 mg/l.

EXAMPLE 3

(FIG. 3)

In the pilot-scale experimental sewage treatment plants described in Example 1, iron oxide sludge $Fe_3O_4$ is added to both plants in a quantity of 20% by weight, based on activated sludge dry matter.

In plant II, the effluent (12) of the activated-sludge tank (13) is not delivered to the final settling tank as in plant I, but instead is delivered to a magnetic roller (15) via the receiver (14). The magnetic activated sludge is Table 1 to Example 1

|  |  | After 6 hours Plant | | 1st day | | 2nd day | | 3rd day | | 5th day | | 7th day | | 10th day | | 12th day | |
|---|---|---|---|---|---|---|---|---|---|---|---|---|---|---|---|---|---|
|  |  | I | II | I | II | I | II | I | II | I | II | I | II | I | II | I | II |
| Measurements in activated sludge tank |  |  |  |  |  |  |  |  |  |  |  |  |  |  |  |  |  |
| Influent l/h |  | 430 | 430 | 430 | 430 | 430 | 430 | 430 | 430 | 430 | 430 | 430 | 430 | 430 | 430 | 430 | 430 |
| Retention time | h | 6 | 6 | 6 | 6 | 6 | 6 | 6 | 6 | 6 | 6 | 6 | 6 | 6 | 6 | 6 | 6 |
| $O_2$ content dissolved in aqueous phase | mg/l | 2.8 | 2.7 | 2.4 | 2.5 | 2.3 | 2.3 | 2.9 | 2.8 | 2.7 | 3.1 | 3.2 | 3.4 | 3.6 | 3.5 | 2.9 | 2.8 |
| Sludge volume after 30 mins. settling time | mg/l | 1000 | 370 | 980 | 340 | 970 | 320 | 950 | 330 | 970 | 350 | 1000 | 370 | 1000 | 360 | 970 | 340 |
| Dry matter content | g/l | 4.1 | 5.1 | 3.9 | 4.9 | 3.9 | 4.8 | 3.6 | 4.7 | 3.5 | 4.6 | 3.3 | 4.2 | 2.9 | 4.3 | 3.0 | 4.1 |
| Sludge index | ml/g | 244 | 73 | 251 | 69 | 249 | 67 | 264 | 70 | 277 | 76 | 303 | 88 | 344 | 84 | 323 | 82 |
| Measurements in effluent of final settling stage |  |  |  |  |  |  |  |  |  |  |  |  |  |  |  |  |  |
| Settable materials after 2 hours | ml/l | 32 | 0.3 | 44 | 0.2 | 47 | 0.1 | 62 | 0.2 | 48 | 0.2 | 42 | 0.1 | 51 | 0.2 | 50 | 0.1 |
| Suspended matter in the supernatant phase | mg/l | 372 | 176 | 326 | 90 | 364 | 56 | 418 | 90 | 326 | 82 | 318 | 52 | 382 | 86 | 366 | 66 |
| COD elimination (homogen. sample) | % | 84 | 95 | 82 | 94 | 86 | 94 | 82 | 94 | 80 | 96 | 82 | 94 | 78 | 95 | 80 | 95 |

Blank test, plant I without $Fe_3O_4$ (Comparison)
Test according to the invention, plant II with $Fe_3O_4$ (Magentite)

EXAMPLE 2

Figure 2:
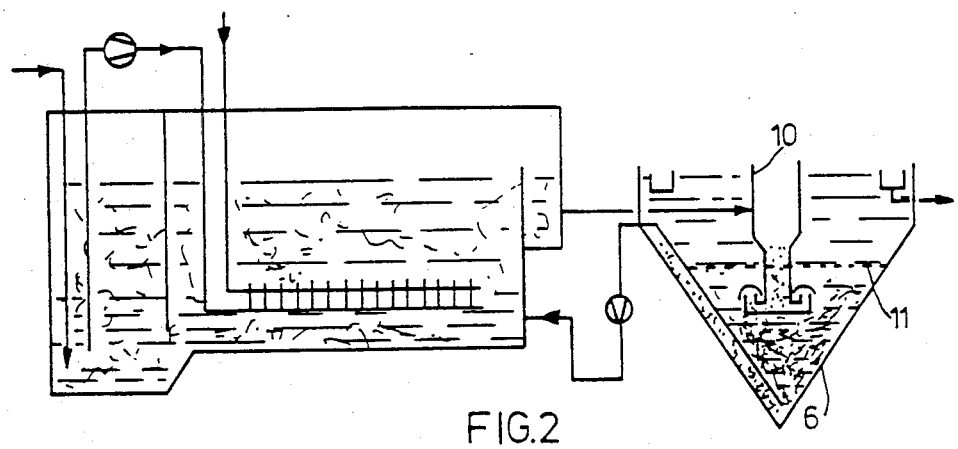
Figure 2A:
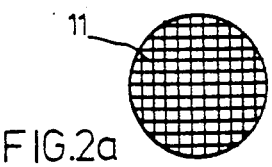
Figure 3:
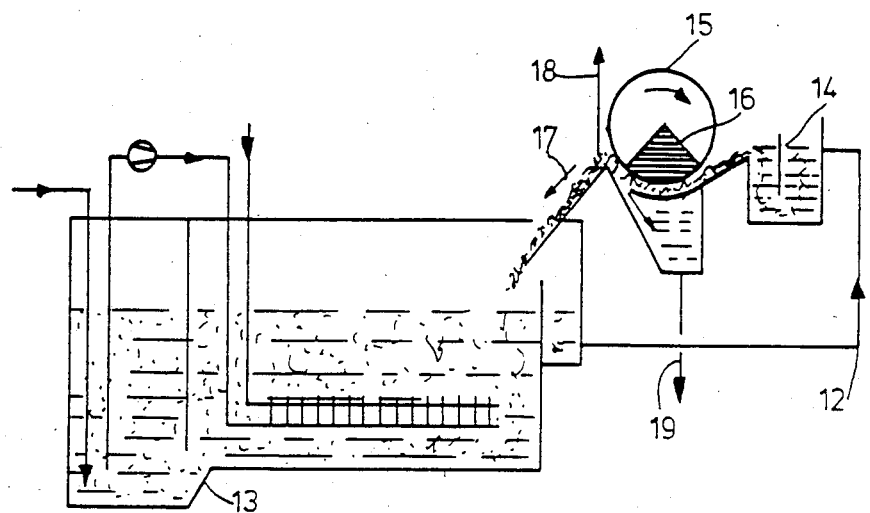
Figure 4:
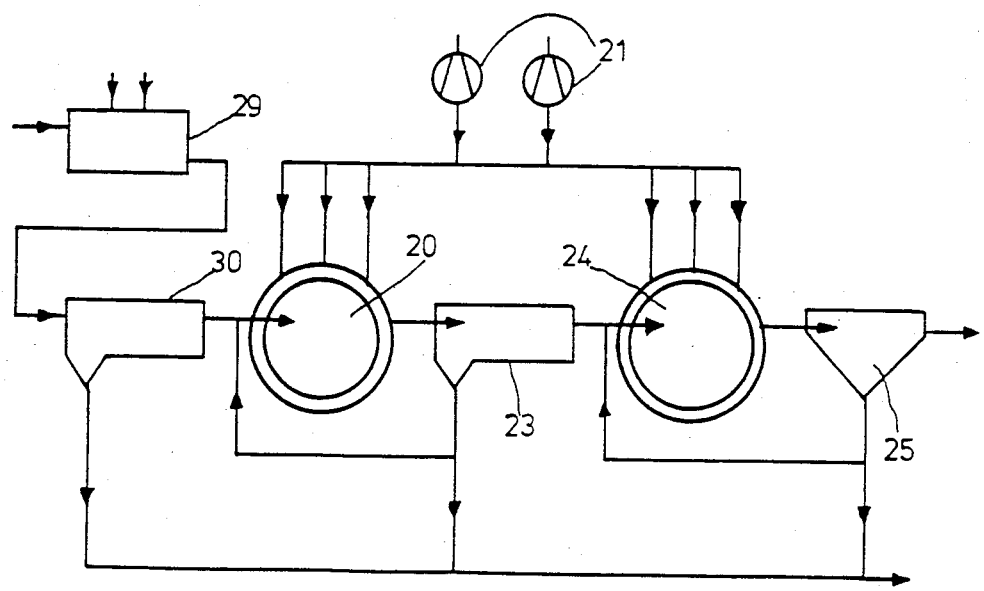

(FIGS. 1 and 2)

(FIG. 2 is a detail of FIG. 1 equipped with a magnetic grid)

As in Example 1, the two pilot-scale experimental treatment plants are charged with bulking sludge from the industrial plant and again operated in parallel.

On this occasion, 3 liters of an iron oxide sludge suspension ($Fe_3O_4$), corresponding to a content of 7.2% by weight based on activated sludge dry matter, are introduced into plant II in accordance with the invention. A magnetic grid (11) based on a permanent magnet was installed in the final settling tank (6) above the outlet opening of the feed cyclones (10). For comparison, quantitatively separated by the magnetic roller with the permanent magnet (16). The sludge on the magnetic roller is returned via the stripper (17) to the activated sludge tank (13) and the surplus sludge is removed via the channel (18). The clear liquid of the purified sewage from the bowl of the magnetic roller is run off through the pipe (19).

The measurement results from plant I with the final settling tank and from plant II without a final settling tank, but with magnetic rollers instead, are set out in Table 2 below.

It can be seen that, with the aid of magnetite, the activated sludge is separated off as effectively in a magnetic field, but more quickly and without any need for final settling.

Table 2 to Example 3

| | | 1st day Plant | | 2nd day | | 3rd day | | 4th day | | 5th day | | 6th day | | 7th day | |
|---|---|---|---|---|---|---|---|---|---|---|---|---|---|---|---|
| | | I | II | I | II | I | II | I | II | I | II | I | II | I | II |
| Measurements in the activates sludge tank | | | | | | | | | | | | | | | |
| Influent | l/h | 430 | 430 | 430 | 430 | 430 | 430 | 430 | 430 | 430 | 430 | 430 | 430 | 430 | 430 |
| Retention time | h | 6 | 6 | 6 | 6 | 6 | 6 | 6 | 6 | 6 | 6 | 6 | 6 | 6 | 6 |
| $O_2$-content dissolved in aqueous phase | mg/l | 3.1 | 2.8 | 2.6 | 2.7 | 3.0 | 3.1 | 2.4 | 2.6 | 2.6 | 2.9 | 2.8 | 2.7 | 2.8 | 3.0 |
| Sludge volume after 30 mins. settling | ml/l | 380 | 360 | 360 | 370 | 440 | 420 | 330 | 320 | 370 | 350 | 310 | 360 | 330 | 350 |
| Dry matter content | g/l | 4.7 | 4.6 | 4.6 | 4.6 | 4.5 | 4.4 | 4.4 | 4.3 | 4.4 | 4.5 | 4.2 | 4.3 | 4.1 | 4.2 |
| Sludge index | ml/g | 81 | 78 | 80 | 80 | 76 | 73 | 75 | 74 | 84 | 78 | 74 | 84 | 80 | 83 |
| Measurements in the effluent | | | | | | | | | | | | | | | |
| Settable materials | ml/l | 0.3 | 0.3 | 0.1 | 0.2 | 0.1 | 0.1 | 0.2 | 0.1 | 0.1 | 0.2 | 0.2 | 0.2 | 0.1 | 0.1 |
| Suspended matter in the supernatant phase | mg/l | 91 | 79 | 56 | 71 | 62 | 59 | 76 | 54 | 57 | 68 | 81 | 73 | 60 | 64 |
| COD-elimination (homogen. sample) | % | 93 | 92 | 93 | 94 | 96 | 95 | 94 | 93 | 96 | 96 | 93 | 94 | 95 | 96 |

Single-stage biological sewage treatment with addition of magnetite
Plant I with final settling tank
Plant II with a magnetic roller instead of final settling tank

EXAMPLE 4

(FIG. 4)

(Two-stage biological sewage treatment in an industrial sewage treatment plant)

The neutralized and mechanically preclarified sewage is delivered to the activated sludge tank (20). For a tank volume of 6000 m³ and an influent volume of 600–700 m³/h, the average retention time in the activated tank is 8 to 10 hours. The oxygen required for the metabolism processes is delivered as air together with the sewage-sludge mixture by the blowers (21) in conjunction with ejectors in the bottom of the tank.

In the following intermediate settling stage (23), the activated sludge separates from the partly purified sewage in an average retention time of 3 hours. The activated sludge is transported by sludge collectors into hoppers and is largely returned to the activated-sludge tank (20) of the first stage. The surface activated sludge formed from the proliferation of microorganisms is disposed of as clarified sludge.

The partly purified sewage flows from the intermediate settling stage (23) into the second activated-sludge stage (24) where the biological treatment process is completed over an average retention time of 11 to 13 hours. Oxygen is introduced in the same way as in the first activated sludge stage. The mixture of activated sludge and sewage from the second activated sludge stage (24) passes into the final settling stage (25) in the form of hopper tanks (Dortmund wells) for separation of the activated sludge from the now fully biological purified sewage.

In this two-stage industrial sewage treatment plant consisting of two lines each with neutralization, preliminary clarification, activated sludge stage I, intermediate settling, activated-sludge stage II and final settling, the two lines being of the same dimensions and operated in the same way, bulking sludge was formed in both lines with sludge spilling over from the final settling tanks.

In the same way as the pilot-scale experiments increase the weight of and hence to sediment the bulking sludge by addition of magnetic iron oxide sludge, a 25% aqueous iron oxide ($Fe_3O_4$) suspension is first introduced into the second activated sludge tank (capacity 8000 m³) of one line in a quantity of 20 m³ corresponding to 20% by weight of $Fe_3O_4$, based on activated sludge dry matter. After only 4 hours, the effluent from the hopper tanks shows a clear phase so that no more sludge spills over, whereas in the comparison line (without magnetite) bulking sludge continues to be discharged.

The comparative measurements in the presence of bulking sludge between the line without addition of iron oxide sludge and the line where iron oxide sludge is added are set out in Table 3 below.

Table 3 to Example 4

| | | After 4 hours Plant | | 1st day | | 2nd day | | 3rd day | | 5th day | | 7th day | | 10th day | | 12th day | |
|---|---|---|---|---|---|---|---|---|---|---|---|---|---|---|---|---|---|
| | | I | II | I | II | I | II | I | II | I | II | I | II | I | II | I | II |
| Measurements in the 2nd stage actived sludge tank | | | | | | | | | | | | | | | | | |
| Influent | l/h | 610 | 610 | 670 | 670 | 670 | 670 | 675 | 675 | 695 | 695 | 700 | 640 | 640 | 640 | 630 | 630 |
| Retention time | h | 13.1 | 13.1 | 11.9 | 11.9 | 11.9 | 11.1 | 11.8 | 11.8 | 11.5 | 11.5 | 11.4 | 11.4 | 12.5 | 12.5 | 12.7 | 12.7 |
| $O^2$ content dissolved in aqueous phase | mg/l | 2.5 | 2.7 | 2.1 | 2.5 | 2.4 | 2.5 | 2.7 | 2.8 | 2.5 | 2.7 | 2.9 | 2.8 | 2.7 | 3.4 | 2.9 | 2.9 |
| Sludge volume after 30 mins. settling | ml/l | 990 | 540 | 980 | 390 | 960 | 400 | 970 | 360 | 970 | 370 | 950 | 360 | 980 | 340 | 970 | 360 |
| Dry matter content | g/l | 3.9 | 4.4 | 4.2 | 4.5 | 4.1 | 4.4 | 3.8 | 4.3 | 3.7 | 4.1 | 3.8 | 4.1 | 3.6 | 4.0 | 3.5 | 3.8 |

-continued

Table 3 to Example 4

| | | After 4 hours Plant | | 1st day | | 2nd day | | 3rd day | | 5th day | | 7th day | | 10th day | | 12th day | |
|---|---|---|---|---|---|---|---|---|---|---|---|---|---|---|---|---|---|
| | | I | II | I | II | I | II | I | II | I | II | I | II | I | II | I | II |
| Sludge index Measurements in the effluent of the final settling tank | ml/g | 254 | 123 | 233 | 87 | 234 | 91 | 255 | 84 | 262 | 90 | 250 | 88 | 272 | 85 | 277 | 95 |
| Settable matter after 2 hours | ml/l | 45 | 0.2 | 42 | 0.1 | 47 | 0.1 | 58 | 0.2 | 43 | 0.1 | 51 | 0.1 | 48 | 0.1 | 51 | 0.2 |
| Suspended matter in the supernatant phase | mg/l | 302 | 102 | 308 | 56 | 338 | 76 | 376 | 74 | 214 | 76 | 304 | 72 | 274 | 82 | 268 | 88 |
| COD-elimination (homogen. sample) | % | 86 | 95 | 80 | 96 | 78 | 95 | 82 | 95 | 80 | 94 | 82 | 93 | 81 | 93 | 84 | 96 |
| Sludge level (measured from the water surface) | m | 0 | 5.80 | 0 | 5.60 | 0 | 6.20 | 0 | 6.10 | 0 | 5.60 | 0 | 6.00 | 0 | 5.90 | 0 | 5.90 |

Two-stage biological sewage treatment in an industrial plant comprising two parallel lines.
Line I without magnetite (comparison)
Line II with magnetite (according to the invention)

In view of the excellent results obtained in the sedimentation of bulking sludge, 20 m³ of iron oxide sludge was also added to the second line of the second activated sludge stage with equally favorable results.

As a significant side effect, an approx. 30% saving of polyelectrolyte was achieved in the subsequent removal of water from the clarified sludge which is carried out in screen belt presses after the addition of polyelectrolyte.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the improved separation of clarified liquid from biomass in the biological treatment of sewage, comprising
   (a) combining the biomass in the clarified liquid with from 1 to 150% by weight, based on the activated sludge dry matter, of magnetically separable inorganic materials having particle sizes of less than 50 μm,
   (b) thoroughly mixing the components of step (a), and
   (c) separating the biomass containing said inorganic materials from the clarified liquid by sedimentation in separate settling tanks.

2. The process of claim 1 characterized in that only a portion of the mixture of biomass and magnetically separable inorganic materials is irreversibly removed by sedimentation, and the larger part is recycled to an activated-sludge stage.

3. A process for the improved separation of clarified liquid from biomass and the biological treatment of sewage, comprising:
   (a) combining the biomass in the clarified liquid with from 1 to 150% by weight, based on the activated sludge dry matter, of magnetite having a particle size of less than 50 μm,
   (b) thoroughly mixing the components of step (a), and
   (c) separating the biomass containing said magnetite from the clarified liquid in a magnetic field.

4. The process of claim 3 wherein step (c) comprises sedimenting and applying a magnetic field.

5. The process of claim 3, characterized in that only a portion of the mixture of biomass and magnetite is irreversibly removed by separation in a magnetic field, and the larger part is recycled to an activated-sludge stage.

* * * * *